Figure 10:
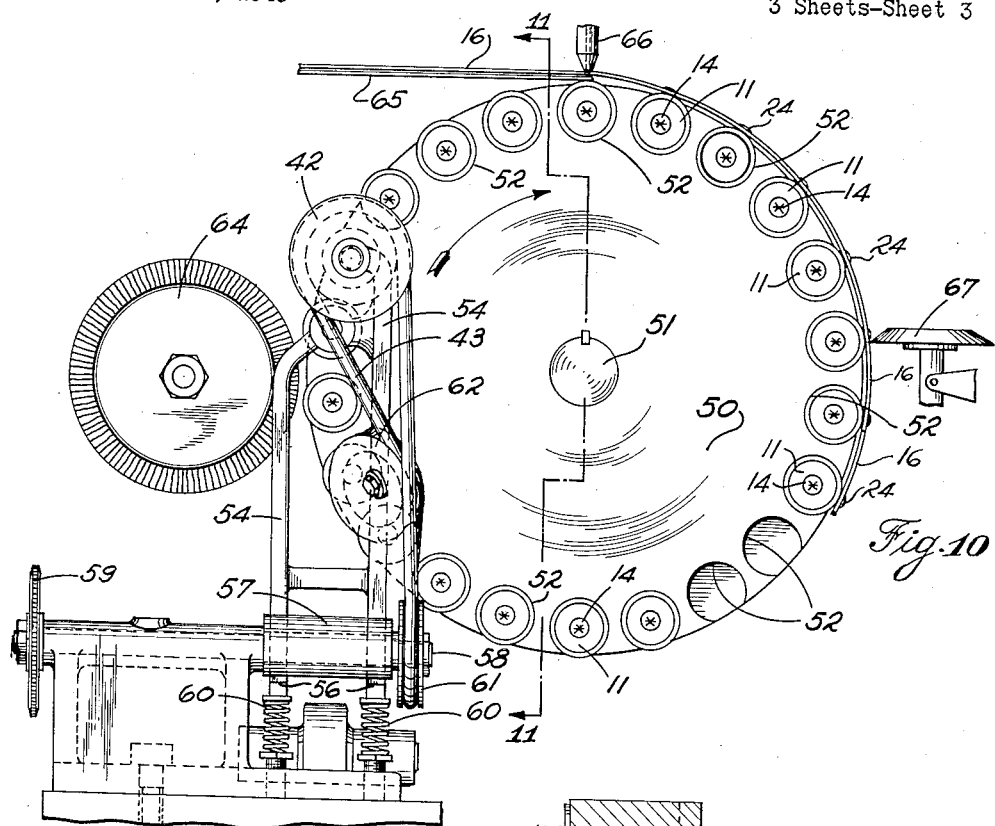

Nov. 20, 1951 A. F. ROCK 2,575,976
SOLDERING CONNECTOR OF DRY BATTERIES
Filed Jan. 15, 1948 3 Sheets-Sheet 1
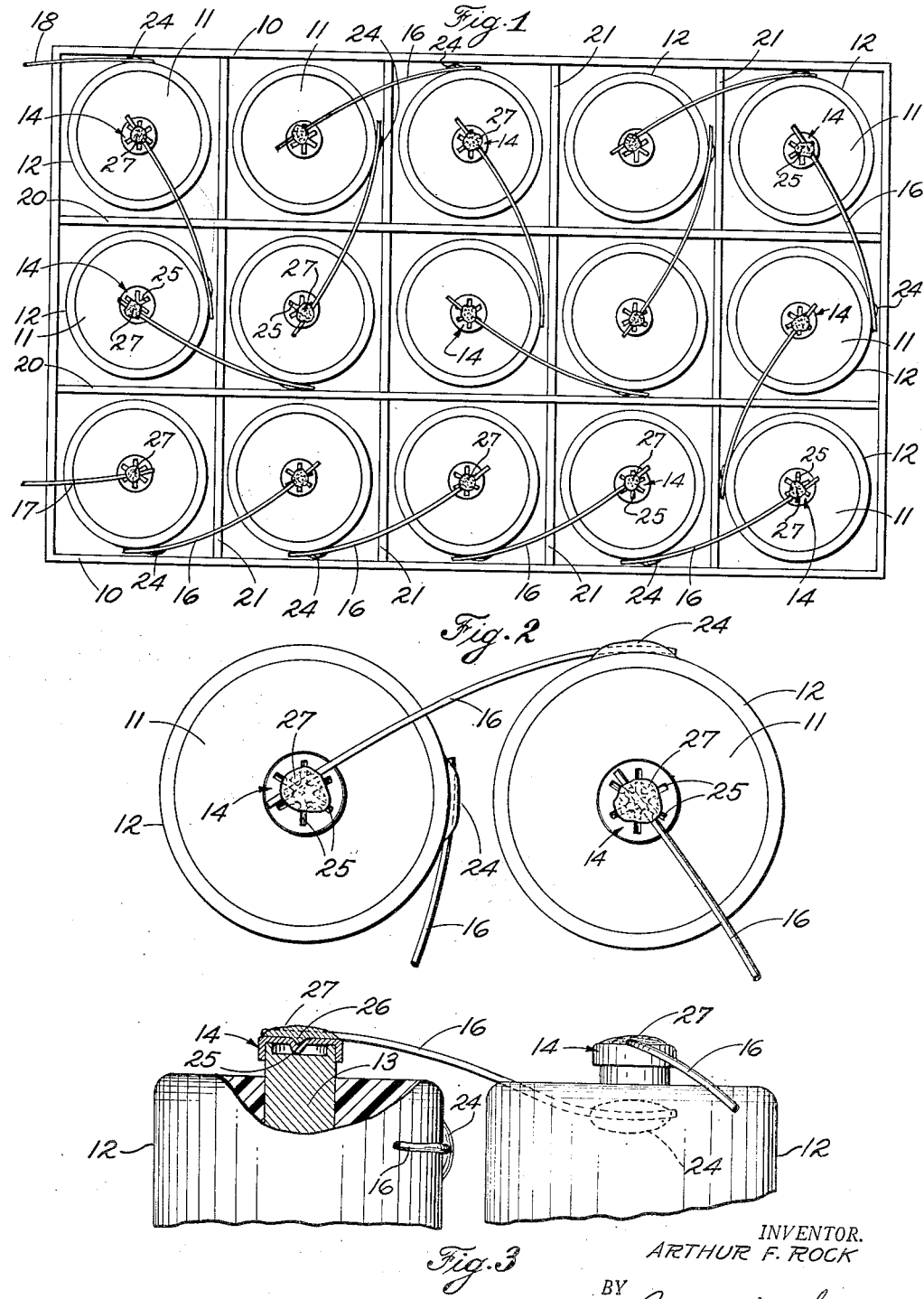
INVENTOR.
ARTHUR F. ROCK
BY
Bosworth & Sessions
ATTORNEYS

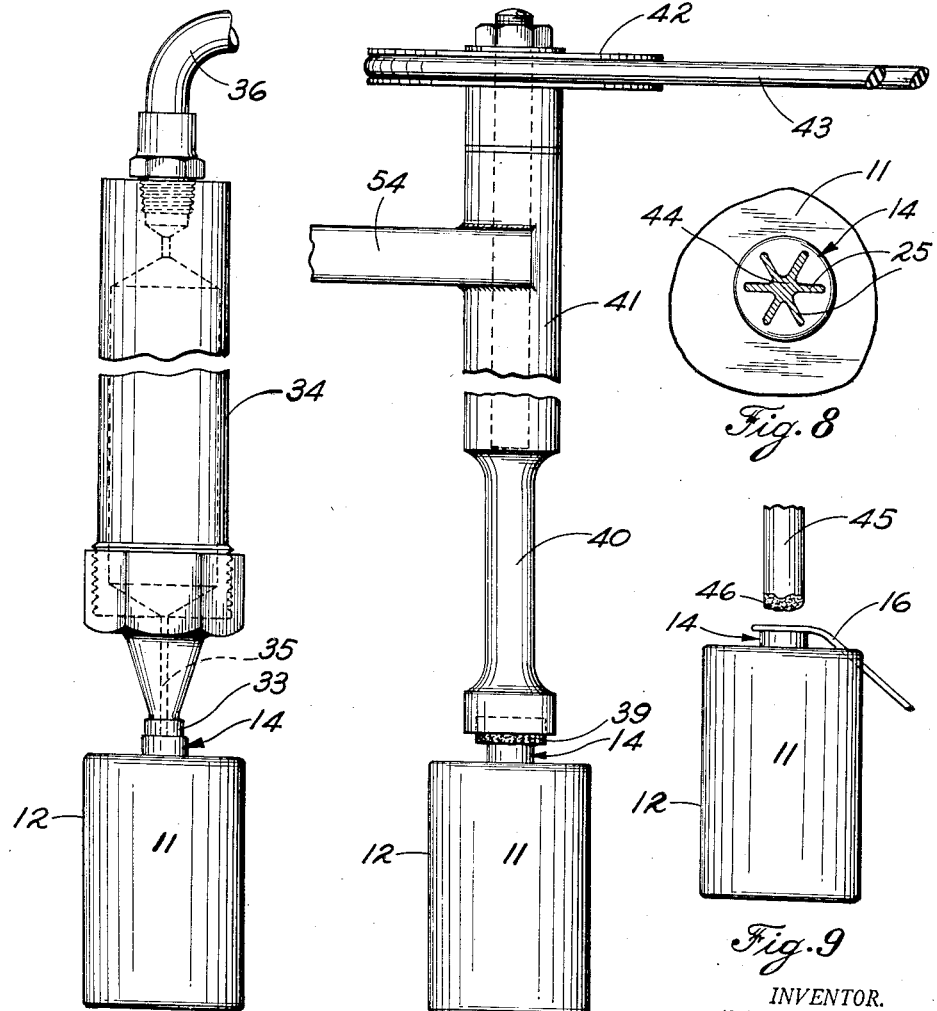

Nov. 20, 1951 A. F. ROCK 2,575,976
SOLDERING CONNECTOR OF DRY BATTERIES
Filed Jan. 15, 1948 3 Sheets-Sheet 3

INVENTOR.
ARTHUR F. ROCK
BY Bosworth & Sessions
ATTORNEYS

Patented Nov. 20, 1951

2,575,976

UNITED STATES PATENT OFFICE 2,575,976

SOLDERING CONNECTOR OF DRY BATTERIES

Arthur F. Rock, Lakewood, Ohio, assignor to General Dry Batteries, Inc., Lakewood, Ohio, a corporation of Ohio Application January 15, 1948, Serial No. 2,518

8 Claims. (Cl. 136—135)

This invention relates to dry cell batteries, and is particularly advantageous as applied to batteries embodying a considerable number of cells, for example, batteries of the type adapted for service as batteries in radio receivers and the like.

Batteries for radio receivers, hearing aids and the like require from 2 to 100 or more individual cells connected in series by wires soldered to the zinc of one cell and to a brass or other metal cap in contact with the carbon of an adjacent cell. The soldering of the wires to the zinc cans of the cells can be accomplished rapidly and expeditiously by means of the method and apparatus described in the Deibel Patent No. 1,739,506. However, serious difficulties have been encountered in soldering the wires to the brass caps on the carbons of the cells. According to one prior method, this soldering operation has been carried out by arranging the cells in the desired manner to make up a battery and disposing the wires, which already have been soldered to the zinc cans, across the tops of the caps on the carbon electrodes. Thereafter, soldering flux is applied to the brass caps by means of a fabric pad. This operation is time-consuming, and is apt to result in displacement of the wires from their required positions over the brass caps. The flux is applied rather indiscriminately; the operation is thus wasteful of flux, and if a corrosive flux is used, the spattering of the flux may result in damage to the battery. The solder is applied by means of a battery of soldering coppers arranged to contact simultaneously all of the wires and brass caps of a battery. However, because of the unsatisfactory method of applying the flux, the fact that some of the wires may have been dislodged in the operation of applying the flux and the fact that the flux is applied on the upper surfaces of the wires rather than between the wires and the caps, many of the wires are soldered poorly or not at all; these faulty connections must be found by careful inspection and then repaired by time-consuming and expensive individual soldering operations.

The present invention is directed to the elimination of the above mentioned difficulties and has for its general object improvements in battery connectors and methods and apparatus for soldering the same whereby secure solder joints of low resistance can be made between conductors and battery carbons at low cost and with very nearly one hundred per cent success in the soldering operation. Further objects of the invention are the provision of an improved cap for the carbons of dry cells and of a simple and effective apparatus for applying flux to such caps preparatory to soldering conductors thereto. Other objects and advantages of the invention will be evident from the following description of a preferred form thereof, reference being made to the accompanying drawings. The essential characteristics are summarized in the claims.

Briefly, I accomplish the objects of my invention by providing the ordinary brass or other metal cap which is customarily employed to cover the exposed end of the carbon electrode of a dry cell, with one or more indentations in the end surfaces thereof. After the cap has been applied to the carbon of a cell, a small amount of conventional soldering flux of a pasty consistency is deposited on the end surface of the cap. The surface of the cap is then wiped with a flat member such as a piece of felt, thus wiping the flux into the indentation and removing any excess amount of flux. Then a solderable conductor, such as a tinned copper wire, is laid across the end surface of the cap, overlying a part of the indentation, and the soldering operation is carried out merely by depositing a small amount of solder over the conductor and in contact with the cap, preferably by means of a soldering copper. The heat of the solder melts the flux, the solder flows into the indentation and adheres to the wire and the cap, thus permanently bonding the wire to the cap with a strong joint of low resistance. Preferably, the flux is supplied to the caps by a simple automatic mechanism, and the soldering operation is carried out with a battery of soldering coppers as in previous methods.

Figure 11:
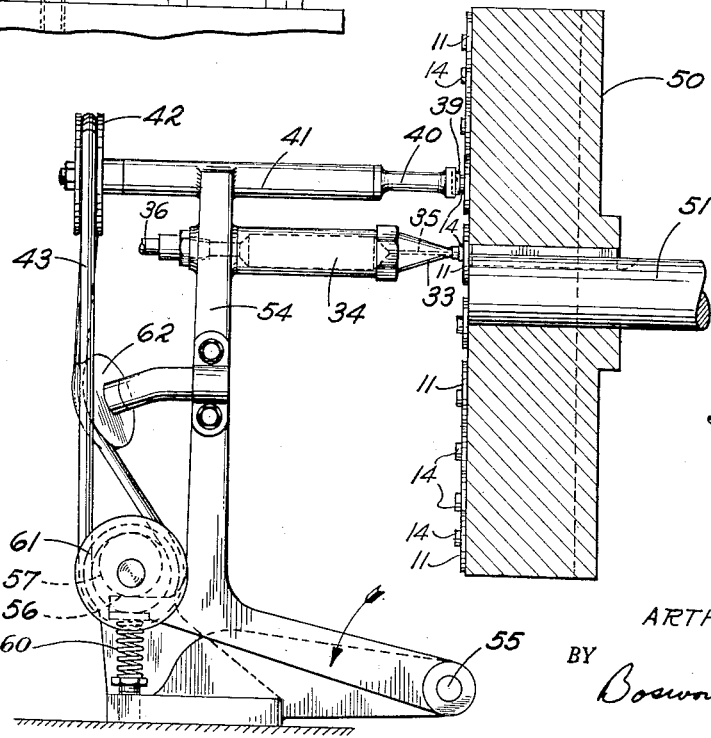

Referring now to the drawings in which a preferred form of the invention is illustrated, Figure 1 is a plan view of a typical B battery embodying my invention; Figure 2 is a plan view on an enlarged scale showing two cells of the battery of Figure 1 and illustrating the soldered connection between the cells; Figure 3 is a side elevational view partially in section showing the cells of Figure 2; Figure 4 is a perspective view partially in section illustrating the brass cap before it has been applied to the carbon of the cell; Figure 5 is a plan view of a cell shown with the cap applied to the carbon; Figure 6 illustrates the application of the flux to the cap; Figure 7 illustrates the operation of wiping the flux into the indentation; Figure 8 is a plan view of the cell at it appears after the flux has been wiped into the indentation; Figure 9 is an elevational view diagrammatically illustrating the soldering of a conductor onto the cell of Figure 8; Figure 10 is a front elevation of a preferred apparatus for applying flux to the caps of cells; and Figure 11 is a sectional view as indicated by line 11—11 of Figure 10.

As shown in Figure 1, a typical battery made according to my invention may comprise a rectangular box or container 10 composed of cardboard or the like having a plurality of cells 11 therein. In the drawing a battery of fifteen cells or 22½ volts is illustrated. Obviously, greater or lesser numbers of cells may be employed in the batteries. Each cell may be of any well-known construction and may comprise a zinc container or cup 12 which constitutes the negative electrode of the cell and a central carbon electrode 13 (see Figure 3) the projecting end of which is covered by a light gage metal cap 14 preferably composed of brass and making a press fit with the carbon electrode.

The cells are connected in series by wires 16 which extend from the carbon of one cell to the zinc of an adjacent cell. Wires 17 and 18, respectively, constitute the positive and negative terminals for connecting the battery to an external circuit. The zinc cups of the individual cells are prevented from contacting with adjacent zinc cups by means of separators 20 and 21, and ordinarily the entire assembly is sealed by pouring a molten insulating compound (not shown) over the cells after the conductors have been soldered in place.

As shown in Figures 2 and 3, each conductor 16 is soldered to a side surface of a zinc cup 12 as indicated at 24, this soldering operation preferably being carried out by means of the method and apparatus described in the aforesaid Deibel Patent No. 1,739,506. The other ends of the conductors 16 are soldered to the caps 14 of adjacent cells, it being noted that the conductors 16 lie across portions of the indentations 25 in the caps 14, the indentations being substantially filled with solder as indicated at 26 in Figure 3, the solder also adhering to and overlying the wires 16 as shown at 27.

The present invention relates particularly to the soldering of the conductors 16 to the caps 14. As shown on an enlarged scale in Figure 4, each cap 14 embodies a cylindrical skirt portion 28 and a radial end surface 29, the skirt being adapted to make a press fit with the carbon 13 of a cell. Ordinarily, such caps have had substantially flat or slightly bulged end surfaces. According to the present invention, the end surface 29 of the cap is provided with an indentation 25 preferably in the form of one or more grooves in any convenient pattern such as a cross, circle, square or the like; preferably a six-branched figure made up of three intersecting grooves as shown is employed. The pattern should extend through a substantial portion of the end surface of the cap so that a conductor lying across the cap will inevitably extend across a portion of the indentation. The grooves preferably are rather narrow, grooves 1/64 to 1/16 inch wide and from about .010 to .020 inch deep being satisfactory, and should have portions extending in different directions in order to eliminate any possibility of all of the flux being wiped out of the indentation.

The caps 14 may be manufactured at low cost by simple and well-known stamping operations; the indentations may be incorporated in the caps at the time of manufacture at no additional cost, and the caps may be pressed onto the carbon electrodes in the same manner and with the same equipment as conventional caps. After the caps have been applied to the electrodes, producing an assembly such as shown in Figure 5, a small mass or gob of a soldering flux of a pasty consistency is applied to the end surface of the cap. A flux composed of zinc chloride and petrolatum or the like is satisfactory. This operation preferably is carried out as shown in Figure 6 by bringing the cap 14 of a cell into contact with a nozzle 33 of the flux gun 34. The flux gun 34 merely comprises a hollow cylinder adapted to contain a supply of pasty flux which is discharged through the passageway 35 in the nozzle by means of air under pressure supplied to the opposite end of the cylinder through a hose 36 connected to a suitable source of compressed air. Preferably the flux is discharged slowly and continuously and in a small thread-like stream; the cells 12 are successively brought into contact with the nozzle for only a sufficient length of time to permit the deposition of the required small amount of flux. For example, for a brass cap about ⅝ of an inch in diameter having grooves as shown in the drawing and described above, a thread-like mass of flux about 1/32 inch in diameter and only about ⅛ inch long is sufficient.

The next step is to wipe the flux deposited on the cap into the indentation substantially to fill the same. This preferably is carried out as shown in Figure 7 by bringing the cap with the flux thereon into contact with a small felt pad 39 mounted in a spindle 40 supported for rotation by sleeve 41 and driven by pulley 42 and belt 43. The cap 14 of the cell is held momentarily against the rotating felt pad, thus distributing the flux throughout the indentation as shown in Figure 8 wherein the indentation is shaded to indicate that it is substantially filled with flux 44. Preferably the operations of applying and spreading the flux are carried out in the simple, automatic apparatus shown in Figures 10 and 11 and to be described in detail below.

The next step is to position a conductor 16 above the cap in such a manner that it overlies at least one of the grooves of the indentation. Then the conductor is soldered onto the cap as shown diagrammatically in Figure 9 by bringing a heated soldering copper 45, the tip of which is coated with molten solder as indicated at 46, into contact with the conductor immediately over the cap 14. As described above, this operation results in the deposition of a drop of solder onto the cap which solidifies to bond the wire to the cap. The soldering operation preferably is carried out after a plurality of cells, having wires 16 soldered to the zinc containers thereof have been assembled as shown in Figure 1 with the wires 16 extending across the caps 14. Then the wires are soldered to the caps by a plurality of soldering coppers supported by a single frame and spaced to correspond to the spacing of the caps 14 in the battery.

It is to be noted that by my invention, the flux is deposited and retained precisely where it is needed. When the wires are disposed over the caps 14, the flux is positioned between the wires and the caps. After the wires have once been put into position, they need not be touched until the soldering operation takes place. Thus, the wires are in proper position during the soldering operation, and the soldering is nearly one hundred per cent effective. Inasmuch as the solder flows into the indentations immediately beneath the wires 16 and is retained in proper position by the indentations, it is unnecessary to apply as much solder as has been required with previous methods. Furthermore, substantial savings in flux are effected, and as the flux is all placed where it is needed, there is no chance of corrosion of other portions of the battery by the flux. Thus, the invention results in substantial saving in time and materials in the manufacture of dry cell batteries, and in a substantial improvement in the quality of the connections between the several cells of the battery.

In order to apply the flux to the caps 14 automatically and at low cost, I preferably employ a conveyor or the like for successively advancing cells to positions adjacent the flux gun and the flux wiping spindle. As shown in Figures 10 and 11, a preferred form of such apparatus comprises a drum 50 supported by a shaft 51 and having recesses 52 adjacent the outer periphery thereof; the recesses 52 are each adapted to receive a dry cell 11. The drum is driven by the shaft 51 with an intermittent or step-by-step rotation by any conventional intermittent driving mechanism (not shown). Each step of the rotation of the drum advances it an angular distance equal to the angular distance between the recesses 52. Thus, cells disposed in the recesses 52 are successively advanced to stations where desired operations can be performed on them. This type of rotary drum mechanism is described in the aforesaid Deibel Patent No. 1,739,506 and is utilized in connection with the soldering of the conductor 16 to the zinc containers 12 of the cells.

In order to apply flux to the caps 14 of the cells, the flux gun 34 and the sleeve 41 which supports the wiping spindle 40 are mounted adjacent the drum on a bracket 54 which is pivotally supported as at 55. The gun 34 and the sleeve 41 are positioned so that the flux-applying nozzles 33 of the flux gun is disposed in substantial alignment with the cap 14 of one cell 11, and the felt pad 39 is in substantial alignment with the cap 14 of another cell. The nozzle and the pad preferably are adapted to engage caps of cells in adjacent recesses, but it is not necessary that the recesses be adjacent so long as the arrangement is such that when the nozzle is in alignment with the cap of a cell, the felt pad 39 is aligned with a cap which has previously been moved past the nozzle. In the position shown in Figure 11, the nozzle is in engagement with the cap of a cell, and the felt pad is in engagement with the cap of a preceding cell. Thus, the nozzle is in position to deposit flux on one cap 14 while the felt pad is in position to wipe the flux previously deposited into the indentation in a cap 14. The drum is stationary during these operations.

In order to retract the flux-applying nozzle and the flux-wiping felt away from the cells so that these mechanisms will not engage the cells as the drum is being rotated, the arm 54 is provided with cam follower surfaces 56 which engage a cam 57 carried by the shaft 58 which is driven by sprocket 59 in timed relationship with the intermittent advancing motion of the drum 50 (the mechanism may be conventional and is not illustrated herein) so that the cam acts to move the arm 54 about its pivot 55 in the direction indicated by the arrow in Figure 11, and thereby to retract the nozzle 33 and pad 39 just before the drum is rotated to advance the cells from one station to the next. The cam permits the springs 60, which hold the follower 56 in engagement with the cam 57, to advance the nozzle and the pad toward the drum and into engagement with the caps 14 of the cells immediately after the drum has stopped rotating and has positioned new cells adjacent the nozzle and pad. The eccentric cam slows down the advancing motion of the parts as they approach engagement with the caps; the springs bring the nozzle and the pad into engagement with the parts with the desired force and compensate for slight variations in the distances which the caps project from the drum 50. The shaft 58 also carries a pulley 61 which drives the spindle drive belt 43, the belt being guided by idler pulley 62.

By the above described apparatus, the flux is applied to the caps efficiently and economically. No additional handling of the cells is required inasmuch as the flux is applied in the same apparatus which solders the wires 16 to the sides of the cans 12. The soldering apparatus includes the wire brush 64, mechanism for feeding the wire 16 and the solder wire 65, the torch 66 and the cutting-off mechanism 67. These parts and the mode of operation of the apparatus are described in greater detail in the aforesaid Deibel patent.

From the foregoing description of a preferred form of my invention, it will be evident that I have provided a simple and effective connection particularly adapted for dry batteries such as radio batteries and the like which embody a comparatively large number of cells. By the use of my apparatus, the flux can be applied to the battery caps at negligible cost. The hand operation of applying flux heretofore required is eliminated, and the amount of flux used is greatly reduced. The operation of soldering conductors to cells provided with caps embodying my invention can be carried out expeditiously and with the assurance that good, permanent connections of low resistance will be produced.

Those skilled in the art will appreciate that various changes and modifications may be made in my invention without departing from the spirit and scope thereof. It is, therefore, to be understood that my patent is not limited to the preferred form of the invention described herein or in any manner other than by the scope of the appended claims.

I claim:

1. The method of securing metal conductors to carbon electrodes of dry cells, which includes the steps of providing a metal cap adapted to fit the electrode and having an indentation made up of a plurality of angularly related intercommunicating grooves in the end surface thereof, applying the cap to an electrode, depositing a mass of paste solder flux on said surface, bringing the cap with the flux thereon into contact with a rotating surface to wipe the flux into said indentation, disposing a conductor in contact with the end surface of the cap and lying across a portion of at least one of said grooves, and thereafter depositing molten solder on said conductor and cap.

2. The method of securing metal conductors to carbon electrodes of dry cells, which includes the steps of providing a metal cap adapted to fit the electrode and having an indentation made up of a plurality of angularly related grooves in the end surface thereof, applying the cap to an electrode, depositing a mass of paste solder flux on said surface, wiping the flux into said indentation, disposing a tinned conductor in contact with the end surface of the cap and lying across a portion of at least one of said grooves and engaging the end surface adjacent said groove, and thereafter depositing molten solder on said conductor and cap by means of a soldering iron.

3. The method of securing wires to electrodes of dry cells, which includes the steps of providing a metal cap adapted to fit the electrode and having an indentation in the end surface thereof, applying the cap to an electrode, depositing a mass of paste solder flux on said surface, wiping the flux into said indentation, disposing a wire in contact with the end surface of the cap and lying across a portion of said indentation and engaging the end surface adjacent the indentation, and thereafter depositing molten solder on said wire and cap.

4. The method of securing conductors to dry cells, which includes the steps of providing a metal member having an indentation in a surface thereof, securing the member to an electrode of the cell, at least partially filling the indentation with a soldering flux, disposing a conductor in contact with said indented surface of said member and lying over a portion only of said indentation and engaging the surface of said member adjacent said indentation, and thereafter depositing molten solder on said conductor and member.

5. The method of making soldered connections for dry cells which includes the steps of providing metal caps adapted to fit the carbon electrodes of dry cells, each cap having an indentation made up of a plurality of angularly related grooves in the end surface thereof, applying each cap to the carbon electrode of a cell, discharging paste solder flux from a nozzle, successively bringing each cell into a position such that the cap of the cell engages said nozzle whereby a mass of solder flux is deposited on the cap, and successively bringing each cap with the flux thereon into contact with a rotating wiping surface, whereby said solder flux is wiped into said indentation.

6. A soldered connection for a dry cell comprising a metal cap engaging the exposed end of the carbon electrode of the cell, said cap having a sleeve portion engaging the side surfaces of the electrode and an end surface disposed over the end of the electrode, there being an indentation in said end surface made up of a plurality of angularly related intercommunicating grooves, and a metal conductor overlying said cap and a portion of at least one of said grooves and engaging said end surface adjacent said groove, said conductor being bonded to said cap by solder adhering to both said conductor and said cap, the solder being disposed in part in one of said grooves.

7. A soldered connection for a dry cell comprising a metal cap engaging the exposed end of the carbon electrode of the cell, said cap having a sleeve portion engaging the side surfaces of the electrode and an end surface disposed over the end of the electrode, there being an indentation in said end surface made up of a plurality of angularly related intercommunicating grooves, and a metal conductor extending from the zinc electrode of another cell and overlying said cap and a portion of at least one of said grooves and engaging a portion of said surface adjacent said groove, said conductor being bonded to said cap by solder adhering to both said conductor and said cap, the solder being disposed in part in one of said grooves.

8. A soldered connection for a dry cell comprising a metal cap engaging the exposed end of the carbon electrode of the cell, said cap having a sleeve portion engaging the side surfaces of the electrode and an end surface disposed over the end of the electrode, there being an indentation comprising a narrow groove in said end surface and the remainder of said end surface being substantially flat, and a metal wire conductor engaging the substantially flat portion of said end surface and overlying a portion only of said indentation, said conductor being bonded to said cap by solder adhering to both said conductor and said cap, the solder being disposed in part in said indentation and in part on the surface adjacent said indentation.

ARTHUR F. ROCK.

REFERENCES CITED

The following references are of record in the file of this patent:

UNITED STATES PATENTS

| Number | Name | Date |
|---|---|---|
| 467,240 | Schoenmehl | Jan. 19, 1892 |
| 901,867 | Ayars | Oct. 20, 1908 |
| 1,533,335 | Peavey | Apr. 14, 1925 |
| 1,723,727 | Eckstein | Aug. 6, 1929 |
| 1,739,506 | Deibel | Dec. 17, 1929 |
| 1,773,310 | Jones et al. | Aug. 19, 1930 |
| 1,951,125 | Brooks | Mar. 13, 1934 |
| 2,018,073 | Laise | Oct. 22, 1935 |
| 2,337,322 | Gascoigne | Dec. 21, 1943 |
| 2,338,409 | Conradty | Jan. 4, 1944 |

FOREIGN PATENTS

| Number | Country | Date |
|---|---|---|
| 326,822 | Great Britain | Mar. 19, 1930 |
| 695,966 | France | Dec. 24, 1930 |
| 811,793 | France | Apr. 22, 1937 |